United States Patent Office 2,776,992
Patented Jan. 8, 1957

2,776,992

TRIFLUOROMETHYLSULFONYLPHENYL-DICHLORACETAMIDOPROPANDIOL

Walter A. Gregory, Wilmington, Del., assignor to E. I. du Pont de Nemours and Company, Wilmington, Del., a corporation of Delaware No Drawing. Application March 14, 1956, Serial No. 571,385

1 Claim. (Cl. 260—562)

This invention relates to halogenoalkylsulfonylphenyl-amido-1,3-propanediols and to processes for preparing them. More particularly it is directed to 1-(p-trifluoromethylsulfonylphenyl) - 2 - (alpha, alpha - dichloroacetamido)-1,3-propanediol.

This application is a continuation-in-part of my copending application, Serial No. 418,227, filed March 23, 1954, which in turn is a continuation-in-part of my parent application Serial No. 257,986, filed November 23, 1951 and both now abandoned.

The halogenoalkylsulfonylphenylamido-1,3-propanediols of my invention are represented by the formula

1.

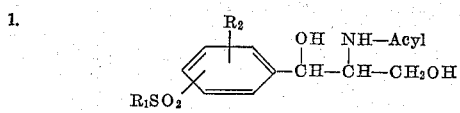

where $R_1$ is a halogenoalkyl group containing not more than 2 carbon atoms, $R_2$ is a member of the group consisting of hydrogen, halogen, lower alkyl and lower alkoxy radicals and acyl is a carboxylic acid acyl radical.

While as indicated the halogenoalkylsulfonyl group can be attached to the phenyl nucleus in either the ortho, meta or para positions, it is preferred to have the halogen alkyl group attached to the carbon of the phenyl ring which is para to the carbon of the diol.

It will be understood that the $R_1$ group of Formula 1 can have up to and including five halogen atoms present. Ordinarily it is preferred to have not more than three of the hydrogen atoms of the methyl or ethyl group replaced by halogen.

The halogenoalkylsulfonylphenylamidopropanediols of the invention can be prepared by any of several routes. One method of producing many of the compounds of this invention comprises reacting a fluorosulfonylphenyl-amidopropanediol of the formula

2.

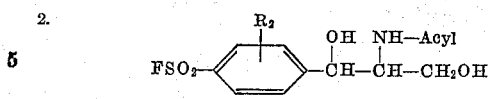

where $R_2$ and acyl have the same significance as in Formula 1 with sodium sulfite and sodium bicarbonate, evaporating the resulting sulfinic acid salt solution to dryness, and reacting the residue with the appropriate halogenoalkyl halide in the presence of a suitable liquid medium such as a lower aliphatic alcohol, water, or dimethylformamide.

The compounds of the type shown in Formula 2 are fully described and claimed in United States Patent 2,680,134.

This method of preparing compounds of my invention can be illustrated as follows:

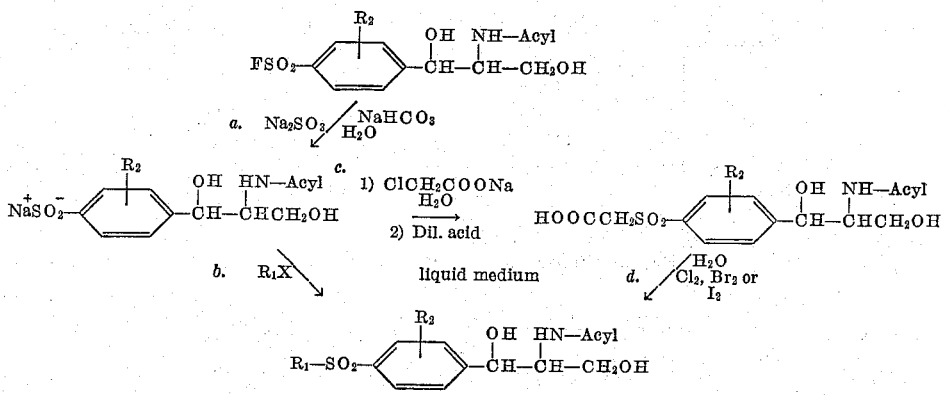

For the preparation of dichloro-, dibromo-, diiodomethyl-sulfonylphenylamidopropanediols, it is preferred to use steps *a*, *c* and *d*. Another method for preparing the compounds of this invention is to start with a halogeno-alkylsulfonylacetophenone of the formula

3.

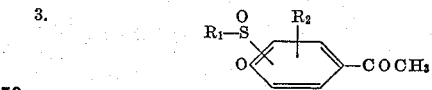

where $R_1$ is a halogenoalkyl group containing not more than 2 carbon atoms, $R_2$ is hydrogen, halogen, lower alkyl or lower alkoxy, and subject a compound of Formula 3 to the steps of halogenation, hexamethylenetetramine addition, hydrolysis with mineral acid, acylation, hydroxymethylation and a Meerwin-Ponndorf-Verley reduction or sodium borohydride reduction.

This six-step process can be represented diagrammatically as follows:

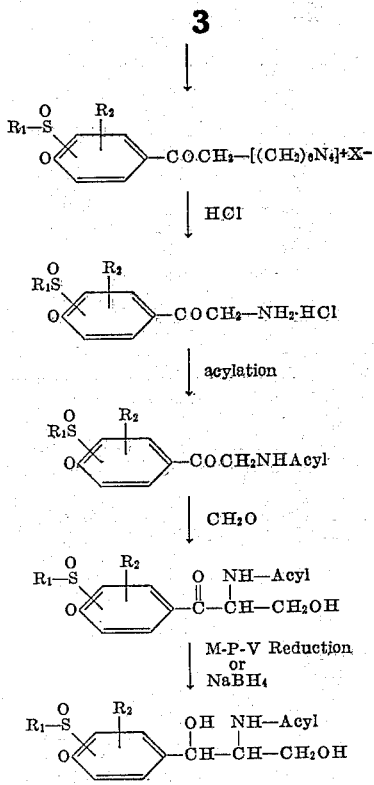

Any of several routes can be employed to prepare the halogenoalkylsulfonylacetophenones of Formula 3. Some of these routes and their interrlationship are shown below.

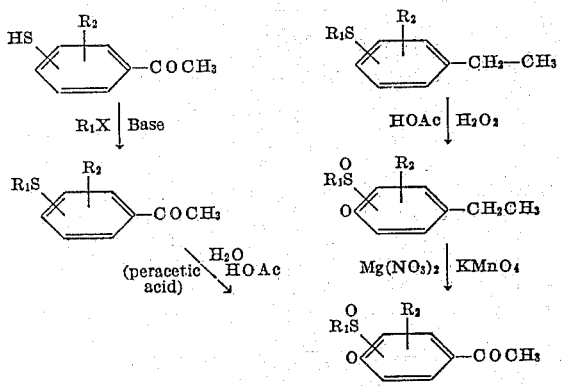

It will be understood that the compounds of this invention can exist in optical isomeric form. Stereoisomeric forms as used herein refer to the spatial arrangement of the polar groups on the two asymmetric carbon atoms with reference to threose and erythrose. To differentiate between these two forms, the diastereoisomeric pair related to threose in configuration has been designated as the threo form while the diastereoisomeric pair related to erythrose as the erythro form or isomer.

Both the threo and erythro forms exist as racemates of optically active dextro and levo rotatory isomers as well as in the form of the individual or separated dextro and levo form. In view of the difficulty of representing the various optical isomers with plane formulae, I have used the customary structural formulas with appropriate notation to designate their optical configuration. Where the formula represents a specific optical configuration, there will be found under the formula an appropriate designation, for example, l-threo, l-erythro, d-threo, dl-threo, and the like.

It will be further understood that where no notation appears with a formula or with a chemical name, the formula or name is to be interpreted in its generic sense, that is, as representing the dextro or levo threo isomers in separated form as well as the dl-threo optical racemates. In other words, a formula or name represents not only the unresolved mixture of isomers but also the individual isomers and racemates.

The compounds of this invention are crystalline solids. Some are soluble in water to the extent of about 2 grams per liter and all are soluble in such solvents as dimethylformamide, dimethylacetamide. They may be crystallized from solvents such as acetonitrile, ethylene chloride and water.

The compounds of the preseent invention are of use as therapeutic agents and find particular use in the control of bacterial, protozoan and rickettsial infections. They are particularly useful in controlling infections caused by Mycobacterium tuberculosis var. bovis. They are also useful in the control of the growth of such microorganisms as Brucella abortus, Bacillus anthracis, Vibris comma and Corynebacterium pyogenes.

Some of the compounds of this invention may also be used as nutritional supplements for livestock and as herbicides.

The preferred compound, 1-(p-trifluoromethylsulfonylphenyl)-2-(alpha,alpha-dichloroacetamido-1,3 - propanediol, is highly effective in controlling bacterial infections in colonies of mice and other laboratory animals bred for research purposes, particularly epidemics of pneumonia caused by Diplococcus pneumoniae.

In order that the invention may be better understood the following specific illustrative examples are given in addition to those already shown.

*Example 1*

A slurry of 1.5 parts of (dl)-threo-1-(p-fluorosulfonyl-

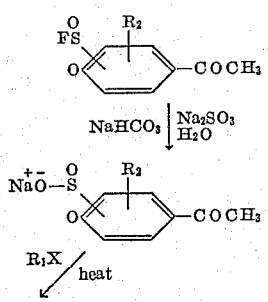

phenyl) - 2 - alpha,alpha - dichloroacetamido)-1,3-propanediol in 15 parts of water containing 1.05 parts of sodium sulfite and 0.7 part of sodium bicarbonate is stirred at a temperature of from 40 to 50° until a clear solution results. The resulting solution of the sulfinic acid salt is evaporated to dryness under reduced pressure and nitrogen. The residue is placed in a sealed tube with 8 parts of absolute ethanol and 2 parts of chloroiodomethane. The tube is heated, and the contents therein are agitated, at a temperature of 80° C. for a period of five hours.

After the tube has been allowed to cool, it is opened. The reaction mixture is removed and evaporated to dryness. The residue is slurried with 25 parts of water. This induces the product to crystallize. The unpurified crystalline material has a melting range of 155–160° C. This melting range is increased upon recrystallization of the product from water to about 164–165° C. The product obtained is (dl)-threo-(p-chloromethylsulfonylphenyl) - 2 - (alpha,alpha - dichloroacetamido) - 1,3-propanediol.

*Analysis.*—Calc. for $C_{12}H_{14}Cl_3NO_5S$: C, 36.89; H, 3.61. Found: C, 36.52; H, 3.83.

Example 2

Chlorine gas is passed into a solution of 228 parts of p-ethylphenyl methyl sulfide in 2880 parts of carbon tetrachloride until 340 parts is taken up. The temperature of the carbon tetrachloride solution is maintained at 25–35° C. during the chlorination. After the addition of chlorine is complete, the solution is stirred for a period of about one hour at normal room temperature. The temperature of the solution is raised to 70° C. and the solution is stirred for an additional period of 30 minutes. The solvent is removed from the system at reduced pressure and the material remaining is crude p-ethylphenyl trichloromethyl sulfide.

A mixture of 383 parts of crude p-ethylphenyltrichloromethyl sulfide and 99 parts of anhydrous hydrogen fluoride is heated to a temperature of 100° C. in a closed metal rocker bomb for a period of two hours. The bomb and its contents are allowed to cool. The bomb is opened. The reaction mixture is mixed with 670 parts of methylene chloride. The resulting solution is washed twice with water and the solvent removed. The residue is fractionated at reduced pressure to give p-ethylphenyl trifluoromethyl sulfide, B. P. 91–92°/30 mm., $n_D^{20}$ 1.4733. The formula of this product is as follows:

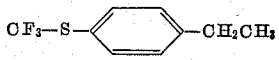

*Analysis.*—Calcd. for $C_9H_9F_3S$: C, 52.41; H, 4.4; F, 27.64. Found: C, 52.82; H, 4.66; F, 28.0.

To a stirred mixture of 206 parts of p-ethylphenyl trifluoromethyl sulfide and 157.5 parts of acetic acid there is added 392 parts of 40% peracetic acid. Throughout the addition of the peracetic acid the temperature of the sulfide-acid mix is maintained at about 80° C. The reaction mixture is stirred at a temperature of from 80–90° C. for one hour after completion of the peracetic acid addition. The reaction mixture is cooled to room temperature. 200 parts of water is added thereto. Solid sodium sulfite is then added to the aqueous solution until the reaction mixture does not liberate iodine from a solution of sodium iodide in acetic anhydride.

The product which consists essentially of p-ethylphenyl trifluoromethyl sulfone is extracted with hexane. The hexane solution is extracted with aqueous alkali to remove acetic acid. The hexane is then removed and the product is fractionated under reduced pressure and found to have the following properties: B. P. 129–131° at 18 mm., $n_D^{20}$ 1.4726. Ethylphenyl trifluoromethyl sulfone can be represented by the following formula

*Analysis.*—Calcd. for $C_9H_9F_3SO_2$: C, 45.37; H, 3.81; F, 23.93. Found: C, 45.90; H, 4.03; F, 25.3.

To a solution containing 123 parts of magnesium nitrate hexahydrate in 600 parts of water there is added 85.8 parts of p-ethylphenyl trifluoromethyl sulfone in 600 parts of acetone. The resulting mixture is stirred while 76 parts of potassium permanganate are added over a period of three hours. The temperature of the mixture is maintained at 50–55° throughout the $KMnO_4$ addition. After the system is stirred for an hour, the excess permanganate is reacted with sodium sulfite. The product is extracted from the reaction mixture with chloroform. After evaporation of the chloroform, the mixture is fractionated under reduced pressure. The distillate comprised p-ethylphenyl trifluoromethyl sulfone, the starting material. The pot residue, crude p-acetylphenyl trifluoromethyl sulfone, crystallizes on cooling, M. P. 45–55° C. It is crystallized from hexane to give material melting at 56–57° C. This sulfone has the formula

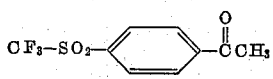

*Analysis.*—Calcd. for $C_9H_7O_3SF_3$: C, 42.86; H, 2.80; F, 22.60. Found: C, 42.99; H, 3.08; F, 23.3.

Sixteen and one-half parts of bromine are added over a period of 30 minutes to a solution containing 25.2 parts of p-acetylphenyl trifluoromethyl sulfone in 105 parts of acetic acid. The reaction mixture is stirred for an hour and then poured into 500 parts of an ice-water mixture. This mixture is stirred for 15 minutes. The crude trifluoromethylphenacyl bromide crystallizes and is filtered off, washed with water, and dried, M. P. 49–51° C.

To a stirred suspension of 37.8 parts of p-trifluoromethylsulfonylphenacyl bromide in 200 parts of ethylene chloride there is added 16 parts of hexamethylenetetramine over a period of ten minutes. The temperature of the bromide is kept at about 18–22° C. during the tetramine addition. The reaction mixture is stirred for 30 minutes and it is then filtered. The filter cake is washed with ethylene chloride and dried to constant weight. The solid product consisting essentially of (p-trifluoromethylsulfonylphenacyl) hexamethylene-tetraminium bromide is white and crystalline in structure. It can be represented by the following formula:

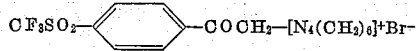

Forty-seven parts of (p-trifluoromethylsulfonyl-phenacyl)-hexamethylenetetraminium bromide is stirred with about 200 parts of 96% ethanol and 10 parts of water. 35 parts of gaseous hydrogen chloride is passed into the alcoholic slurry. The temperature rises during the addition. The reaction mixture is stirred and refluxed for a period of one hour. The mixture is then evaporated to dryness under reduced pressure. The crude mixture thus obtained contains the product, p-(alpha-aminoacetylphenyl)-trifluoromethyl sulfone hydrochloride, which can be represented by the following formula:

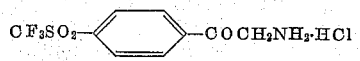

A suspension of 22.5 parts of crude p-(alpha-aminoacetphenyl)trifluoromethyl sulfone hydrochloride in about 35 parts of dichloroacetyl chloride is stirred and heated to a temperature of 80° for a period of 30 minutes. The reaction mixture is cooled to 40° C. and then poured into 300 parts of ice and water. A gum appears. This gum is dried and dissolved in 120 parts of ethanol. Ten parts of water is added and the aqueous alcohol solution is allowed to stand at 5° C. for a period of 2 days. The solid material obtained is collected, M. P. 122–130° C. This material is recrystallized from absolute ethanol and a colorless crystalline compound, M. P. 133–134° C., is obtained. This compound is alpha,alpha-dichloro-N-(p-trifluoromethylsulfonylphenacyl)acetamide. Its structural formula is as follows:

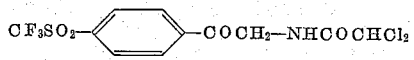

A suspension consisting of 80 parts of alpha,alpha-dichloro-N-(p-trifluoromethylsulfonylphenacyl) - acetamide in 160 parts of 95% ethanol containing 40 parts of 37% aqueous formaldehyde and 1 part of sodium bicarbonate is stirred at a temperature of 22–26° for a period of two hours. The clear solution resulting is poured onto 1250 parts of ice and water. A gummy material forms which contains the product, alpha,alpha-dichloro-N-[2-hydroxy-1 - (p - trifluoromethylsulfonylbenzoyl)ethyl] acetamide which has the formula

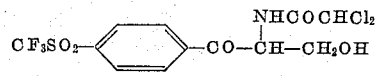

This gummy material is suitable for use in the reduction step described below.

A solution of 1 part of alpha,alpha-dichloro-N-[2-hydroxy - 1 - (p - trifluoromethylsulfonylbenzoyl)ethyl] - acetamide in 10 parts of isopropanol is added to a solution of 0.6 part of aluminum isopropoxide in 12 parts of isopropanol. The reaction mixture is refluxed for a period of sixty minutes. The volume of the resulting solution is reduced under reduced pressure. Ten parts of water and 3 parts of 6 N hydrochloric acid is added. A yellow gum appeared.

The gummy solid is taken up in ethyl acetate and the extract is dried with magnesium sulfate. Upon removing the ethyl acetate under reduced pressure a yellow gum forms. This gum is taken up in ethylene chloride, from which crystals separate on standing, M. P. 135–155° C. The material is recrystallized from ethylene chloride to give colorless crystals of (dl)-threo-1-(p-trifluoromethylsulfonylphenyl) - 2 - (alpha,alpha - dichloroacetamido)-1,3-propanediol, M. P. 164–166° C. The product is soluble in water to the extent of 0.215 gram per liter. Its formula is as follows:

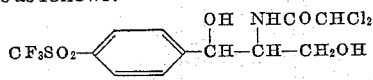

This trifluoromethyl compound gives complete control of pneumococcus infections in mice when administered orally or intraperitoneally at a daily dosage of 750 mg./kg. body weight.

*Example 3*

A slurry of 2 parts of (dl)-threo-1-(p-fluorosulfonylphenyl) - 2 - (alpha,alpha - dichloroacetamido) - 1,3-propanediol in 25 parts of water containing 1.4 parts of sodium sulfite and 0.94 part of sodium bicarbonate is stirred at a temperature of 40–50° C. until a clear solution results. The resulting solution of the sulfinic acid salt is evaporated to dryness under reduced pressure and nitrogen. The residue is sealed into a glass tube with 22 parts of absolute ethanol and 3.4 parts of dibromomethane. The tube is heated and its contents agitated at 85–90° for a period of four hours.

The tube is opened, its contents removed and evaporated to dryness. The residue is slurried with 25 parts of water. This induces crystallization. The crystals are collected by filtration, washed with water and dried, M. P. 164–171° C. Recrystallization from water raises the melting point to 173–175°. The product obtained is (dl) - threo - 1 - (p - bromomethylsulfonylphenyl) - 2- (alpha,alpha - dichloroacetamido) - 1,3 - propanediol. Its structure can be represented by the following formula:

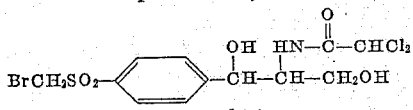

*Example 4*

A stream of chlorine gas is passed into a stirred slurry of 1 part of dl-threo-1-[p-carboxymethylsulfonylphenyl]-2 - (alpha,alpha - dichloroacetamido) - 1,3 - propanediol in 25 parts of water initially at 22° for a period of one hour. The temperature rises to 26° in the first few minutes, then declines. A gummy material comes out of solution as the reaction proceeds. The gummy product is dissolved as far as possible in 100 parts of water. The solution is filtered, and the filtrate is neutralized with sodium bicarbonate and set aside. After several hours crystals are formed. These are filtered off and dried, M. P. 173–175° C. The crystalline product is dl-threo-1 - (p - dichloromethylsulfonylphenyl) - 2 - (alpha,alpha-dichloroacetamido)-1,3-propanediol, with a structure represented by the following formula:

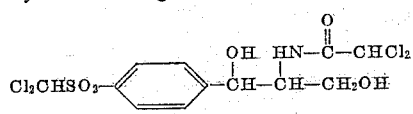

*Analysis.*—Calcd. for $C_{12}H_{13}Cl_4NO_5S$: C, 33.90; H, 3.08. Found: C, 33.90; H, 3.13.

*Example 5*

A suspension of 5 parts of (dl)-threo-1-(p-fluorosulfonylphenyl) - 2 - (alpha,alpha - dichloroacetamido)-1,3-propanediol in 100 parts of water containing 3 parts of sodium sulfite and 1 part of sodium bicarbonate is stirred while being heated to 65° C. for two hours in a nitrogen atmosphere. The mixture becomes homogeneous. It is then concentrated under reduced pressure. During the concentration a mixture of benzene and absolute ethanol is added to remove the water.

The solid residue is suspended in absolute ethanol and 100 parts of ethylene bromide is added and the mixture warmed to 60° C. in a water bath for seven hours. The mixture is refluxed for a period of two hours and then filtered free of solid salts. The solution is concentrated under reduced pressure.

The residue is slurried with water until the crystals separate. This product is a mixture, which can be crystallized from acetonitrile to yield the desired product, (dl) - threo - 1 -[p - (2 - bromoethylsulfonyl)phenyl]-2 - (alpha,alpha - dichloroacetamido) - 1,3 - propanediol. It is a white crystalline solid and has the structure:

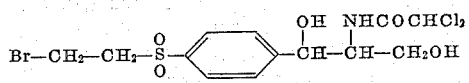

The following compounds are listed as further examples:

*Example 6*

1 - (p - difluoromethylsulfonylphenyl) - 2 - (alpha,-alpha-dichloroacetamido)-1,3-propanediol.

*Example 7*

1 - (p - dibromomethylsulfonylphenyl) - 2 - (alpha,-alpha-dichloroacetamido)-1,3-propanediol.

*Example 8*

1 - (p-fluoromethylsulfonylphenyl) - 2 - (alpha,alpha-dichloroacetamido)-1,3-propanediol.

*Example 9*

1 - (p - trichloromethylsulfonylphenyl) - 2 - (alpha,-alpha-dichloroacetamido)-1,3-propanediol.

*Example 10*

1 - (p - tribromomethylsulfonylphenyl) - 2 - (alpha,-alpha-dichloroacetamido)-1,3-propanediol.

*Example 11*

1-(p-iodomethylsulfonylphenyl) - 2 - (alpha,alpha-dichloroacetamido)-1,3-propanediol.

*Example 12*

1-[p-(1-chloroethylsulfonyl)phenyl]-2 - (alpha,alpha-dichloroacetamido)-1,3-propanediol.

*Example 13*

1-[p-(2-chloroethylsulfonyl)phenyl] - 2 - (alpha,alpha-dichloroacetamido)-1,3-propanediol.

*Example 14*

1-[p-(2-iodoethylsulfonyl)phenyl] - 2 - (alpha,alpha-dichloroacetamido)-1,3-propanediol.

*Example 15*

1-[m-(2-bromoethylsulfonyl)phenyl] - 2 - (alpha,alpha-dichloroacetamido)-1,3-propanediol.

*Example 16*

1-[p-(2-fluoroethylsulfonyl)phenyl] - 2 - (alpha,alpha-dichloroacetamido)-1,3-propanediol.

*Example 17*

1-[p-(1-bromoethylsulfonyl)phenyl] - 2 - (alpha,alpha-dichloroacetamido)-1,3-propanediol.

Example 18

1-[p-(1,1 - dichloroethylsulfonyl)phenyl] - 2 - alpha,alpha-dichloroacetamido)-1,3-propanediol.

Example 19

1-[p-(2,2,2-trichloroethylsulfonyl)phenyl] - 2 - (alpha,alpha-dichloroacetamido)-1,3-propanediol.

Example 20

1-[p-(2,2,2-trifluoroethylsulfonyl)phenyl] - 2 - (alpha,alpha-dichloroacetamido)-1,3-propanediol.

Example 21

1-[p-(1,1,2,2,2-pentachloroethylsulfonyl)phenyl] - 2 - (alpha,alpha-dichloroacetamido)-1,3-propanediol.

Example 22

1-[p-(1,1,2,2,2-pentafluoroethylsulfonyl)phenyl] - 2 - (alpha,alpha-dichloroacetamido)-1,3-propanediol.

Example 23

1-[p-(1,1,2,2-tetrachloroethylsulfonyl)phenyl] - 2 - (alpha,alpha-dichloroacetamido)-1,3-propanediol.

Example 24

1 - [p - (2-bromo-1,1-dichloroethylsulfonyl)phenyl]-2-(alpha,alpha-dichloroacetamido)-1,3-propanediol.

Example 25

1 - (m - chloromethylsulfonylphenyl)-2-(alpha,alpha-dichloroacetamido)-1,3-propanediol.

Example 26

1 - (o - chloromethylsulfonylphenyl)-2-(alpha,alpha-dichloroacetamido)-1,3-propanediol.

Example 27

1 - (4 - dichloromethylsulfonyl-2-methylphenyl)-2-(alpha,alpha-dichloroacetamido)-1,3-propanediol.

Example 28

1 - (2 - chloro-4-dichloromethylsulfonylphenyl)-2-(alpha,alpha-dichloroacetamido)-1,3-propanediol.

Example 29

1 - (4 - bromomethylsulfonyl-2-methoxyphenyl)-2-(alpha,alpha-dichloroacetamido)-1,3-propanediol.

Example 30

1 - (p - chloromethylsulfonylphenyl)-2-(alpha,alpha-dibromoacetamido)-1,3-propanediol.

Example 31

1 - (p - chloromethylsulfonylphenyl)-2-acetamido-1,3-propanediol.

Example 32

1 - (p - chloromethylsulfonylphenyl)-2-(alpha-chloroacetamido)-1,3-propanediol.

Example 33

1 - (p - chloromethylsulfonylphenyl)-2-benzamido-1,3-propanediol.

I claim:

1-(p-trifluoromethylsulfonylphenyl) - 2 - (alpha,alpha-dichloroacetamido)-1,3-propanediol.

No references cited.